US011978153B2

(12) United States Patent
Wang

(10) Patent No.: US 11,978,153 B2
(45) Date of Patent: May 7, 2024

(54) METHOD FOR DETERMINING VISIBLE ANGLE OF TARGET OBJECT, ELECTRONIC DEVICE, AND STORAGE MEDIUM

(71) Applicant: Beijing Baidu Netcom Science Technology Co., LTD., Beijing (CN)

(72) Inventor: Lingguang Wang, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 34 days.

(21) Appl. No.: 17/808,931

(22) Filed: Jun. 24, 2022

(65) Prior Publication Data
US 2022/0319101 A1 Oct. 6, 2022

(30) Foreign Application Priority Data
Sep. 30, 2021 (CN) .......................... 202111163517.9

(51) Int. Cl.
*G06T 15/20* (2011.01)
*G06F 16/9537* (2019.01)
*G06T 7/60* (2017.01)
*G06T 7/70* (2017.01)
(Continued)

(52) U.S. Cl.
CPC .......... *G06T 15/20* (2013.01); *G06F 16/9537* (2019.01); *G06T 7/60* (2013.01);
(Continued)

(58) Field of Classification Search
None
See application file for complete search history.

(56) References Cited

U.S. PATENT DOCUMENTS

2015/0130791 A1* 5/2015 Faaland ................... G06T 7/50
 345/419
2019/0347525 A1* 11/2019 Liem ....................... G06V 20/56

FOREIGN PATENT DOCUMENTS

CN 108762855 A 11/2018
CN 111316333 A 6/2020
(Continued)

OTHER PUBLICATIONS

Downs et al., (2001). "Occulsion Horizons for Driving through Urban Scenery," Proceedings of the 2001 Symposium on Interactive 3D Graphics, pp. 121-124.

(Continued)

*Primary Examiner* — Joni Hsu
(74) *Attorney, Agent, or Firm* — MORRISON & FOERSTER LLP

(57) ABSTRACT

A method for determining a visible angle of a target object, an electronic device, and a storage medium are provided. The method includes: acquiring first point of interest POI data of the target object, second POI data of an occluder, and a position of an observation point; determining a first tangent line and a second tangent line of the target object, passing through the position of the observation point, according to the first POI data and the position of the observation point; determining a third tangent line and a fourth tangent line of the occluder, passing through the position of the observation point, according to the second POI data and the position of the observation point; and determining a target visible angle of the target object relative to the occluder according to the first tangent line, the second tangent line, the third tangent line, and the fourth tangent line.

9 Claims, 9 Drawing Sheets

(51) Int. Cl.
*G06T 7/73* (2017.01)
*G06T 11/60* (2006.01)
*G06T 19/00* (2011.01)

(52) U.S. Cl.
CPC ............... *G06T 7/73* (2017.01); *G06T 11/60* (2013.01); *G06T 19/00* (2013.01); *G06T 2219/004* (2013.01)

(56) References Cited

FOREIGN PATENT DOCUMENTS

| | | |
|---|---|---|
| CN | 111694921 A | 9/2020 |
| CN | 111737603 A | 10/2020 |
| CN | 112927363 A | 6/2021 |
| WO | WO-2020062267 A1 | 4/2020 |

OTHER PUBLICATIONS

Durand et al., (1997). "The Visibility Skeleton: A Powerful and Efficient Multi-Purpose Gobal Visibility Tool," Computer Graphics Proceedings, Annual Conference Series, 97:89-100.
Extended European Search Report and Opinion received for European Patent Application No. 22182021.0 dated Jan. 2, 2023, 9 pages.
Red Blob Games, (2020). "2d Visibility," available online at <https://www.redblobgames.com/articles/visibility/>, 16 pages.
Office Action and Search Report received for Chinese Patent Application No. 202111163517.9 dated Sep. 23, 2023, 14 pages. English translation.

* cited by examiner

METHOD FOR DETERMINING VISIBLE ANGLE OF TARGET OBJECT, ELECTRONIC DEVICE, AND STORAGE MEDIUM

CROSS-REFERENCE TO RELATED APPLICATION

This application claims priority to Chinese patent application No. 202111163517.9, filed on Sep. 30, 2021, which is hereby incorporated by reference in its entirety.

TECHNICAL FIELD

The present disclosure relates to the field of computer technology. The present disclosure particularly relates to the technical fields of electronic maps, intelligent transportation, and automatic driving.

BACKGROUND

A panoramic map, also known as a 360-degree panoramic map or a panoramic looking-around map, refers to a map that simulates a three-dimensional picture into a three-dimensional effect of a real object, which can show the surrounding environment.

SUMMARY

The present disclosure provides a method and apparatus for determining a visible angle of a target object, and an electronic device.

According to an aspect of the present disclosure, there is provided a method for determining a visible angle of a target object, including:
- acquiring first point of interest POI data of the target object, second POI data of an occluder, and a position of an observation point;
- determining a first tangent line and a second tangent line of the target object, passing through the position of the observation point, according to the first POI data and the position of the observation point;
- determining a third tangent line and a fourth tangent line of the occluder, passing through the position of the observation point, according to the second POI data and the position of the observation point; and
- determining a target visible angle of the target object relative to the occluder according to the first tangent line, the second tangent line, the third tangent line, and the fourth tangent line.

According to another aspect of the present disclosure, there is provided an electronic device, including:
- at least one processor; and
- a memory communicatively connected with the at least one processor, wherein
- the memory stores instructions executable by the at least one processor, and the instructions, when executed by the at least one processor, enable the at least one processor to perform the method in any one of the embodiments of the present disclosure.

According to another aspect of the present disclosure, there is provided a non-transitory computer-readable storage medium storing computer instructions, wherein the computer instructions, when executed by a computer, cause the computer to perform the method in any one of the embodiments of the present disclosure.

It should be understood that the content described in this section is neither intended to limit the key or important features of the embodiments of the present disclosure, nor intended to limit the scope of the present disclosure. Other features of the present disclosure will be readily understood through the following description.

BRIEF DESCRIPTION OF THE DRAWINGS

The drawings are used to better understand the solution and do not constitute a limitation to the present disclosure. In which.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

In the technical solutions of the present disclosure, the collection, storage, use, processing, transmission, provision, disclosure, etc., of user's personal information involved are all in compliance with the provisions of relevant laws and regulations, and do not violate public order and good customs.

Figure 1:
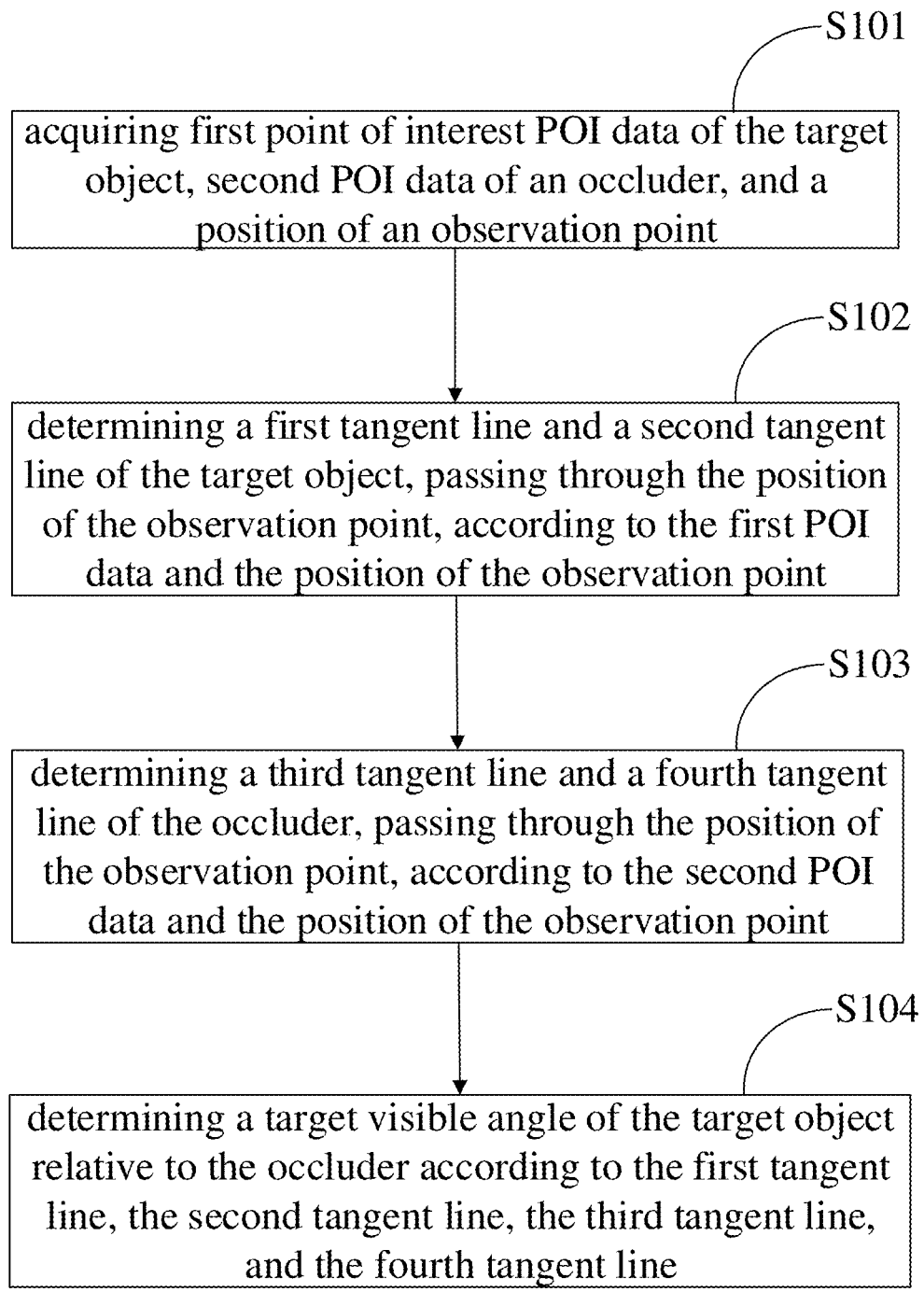
FIG. 1 is a flowchart of a method for determining a visible angle of a target object according to an embodiment of the present disclosure.

According to an embodiment of the present disclosure, a method for determining a visible angle of a target object is provided. FIG. 1 is a flowchart of a method for determining a visible angle of a target object according to an embodiment of the present disclosure, and the method can be applied to an apparatus for determining a visible angle of a target object, which can be deployed in a terminal or server or other processing device. Herein, the terminal can be user equipment (UE), a mobile device, a cellular phone, a cordless phone, a personal digital assistant (PDA), a handheld device, a computing device, a vehicle-mounted device, a wearable device, and the like. In some possible implementations, the method can also be implemented by a processor invoking computer-readable instructions stored in a memory. As shown in FIG. 1, the method includes:

S101, acquiring first point of interest (POI) data of the target object, second POI data of an occluder, and a position of an observation point.

Herein, the target object and the occluder can include, but are not limited to, objects whose positions are fixed, such as buildings and the like, or objects whose positions are fixed for a long period of time. The POI data includes a name, a category, an address, coordinates, area of interest (AOI) data, and the like. Herein, the AOI data is used to represent regional geographic entities in a map, such as a residential area, a university, an office building, an industrial park, a comprehensive shopping mall, a hospital, a scenic spot, a gymnasium, or the like. The AOI data includes AOI shape data, that is, the shape of a two-dimensional graph formed by the projection of a three-dimensional object on a two-dimensional plane, the coordinates of each point in the figure, and the like.

Herein, the POI data of the target object and the occluder can be acquired in advance, stored in a preset database, and called from the preset database when needed. The position of the observation point can be a predetermined position, for example, a navigation end position for navigation to a destination.

S102, determining a first tangent line and a second tangent line of the target object, passing through the position of the observation point, according to the first POI data and the position of the observation point.

Herein, the first tangent line and the second tangent line can be the tangent lines of the two-dimensional graph formed by the projection of the target object on the two-dimensional plane. According to the position of each of points in the two-dimensional graph, i.e., the AOI shape data in the POI data, a plurality of tangent lines of the two-dimensional graph can be determined. For each tangent line, all points in the two-dimensional graph are on the same side of the tangent line. According to the coordinates of each point in the two-dimensional graph and the position of the observation point, two tangent lines of the two-dimensional graph passing through the position of the observation point can be determined as the first tangent line and the second tangent line of the target object. Herein, the two-dimensional plane can include, but is not limited to, a horizontal plane, and in this case, the two-dimensional graph is a top view of the target object.

S103, determining a third tangent line and a fourth tangent line of the occluder, passing through the position of the observation point, according to the second POI data and the position of the observation point.

Herein, the third tangent line and the fourth tangent line can be the tangent lines of the two-dimensional graph formed by the projection of the occluder on the two-dimensional plane. According to the position of each point in the two-dimensional graph, i.e., the AOI shape data in the POI data, a plurality of tangent lines of the two-dimensional graph can be determined. For each tangent line, all points in the two-dimensional graph are on the same side of the tangent line. According to the coordinates of each point in the two-dimensional graph and the position of the observation point, two tangent lines of the two-dimensional graph passing through the position of the observation point can be determined as the third tangent line and the fourth tangent line of the occluder. Herein, the two-dimensional plane can include, but is not limited to, a horizontal plane, and in this case, the two-dimensional graph is a top view of the occluder.

S104, determining a target visible angle of the target object relative to the occluder according to the first tangent line, the second tangent line, the third tangent line, and the fourth tangent line.

Herein, the visible angle of observing the target object at the position of the observation point can be determined according to the first tangent line and the second tangent line (the visible angle at this time is the visible angle when the occluder is not considered), and the visible angle of observing the occluder at the position of the observation point can be determined according to the third tangent line and the fourth tangent line. According to the visible angle of observing the target object and the visible angle of observing the occluder, the target visible angle of the target object relative to the occluder, that is, the visible angle of observing the target object from the position of the observation point when there is an occluder, can be determined.

According to the method for determining a visible angle of a target object provided by the present disclosure, the target visible angle of the target object relative to the occluder is determined according to the first POI data of the target object, the second POI data of the occluder, and the position of the observation point, the target visible angle can be taken as the guiding angle to guide a user to observe the target object, the calculation is simple, and the result is accurate.

After the target visible angle of the target object relative to the occluder is determined, the target visible angle can be applied to the labeling of a panoramic map, as shown in the following embodiments.

In a possible implementation, the method further includes:

in a case where the target visible angle includes a horizontal target visible angle or a vertical target visible angle, marking a POI name in the first POI data of the target object according to the horizontal target visible angle or the vertical target visible angle.

In practical applications, the horizontal target visible angle or the vertical target visible angle is determined, thus the visible range for observing the target object relative to the occluder at the position of the observation point is determined. The POI name can be marked within the visible range.

In the embodiment of the present disclosure, POI marking is performed according to the horizontal target visible angle or the vertical target visible angle, so that a user can observe the POI name of the target object within the visual range determined by the horizontal target visible angle or the vertical target visible angle, avoiding the problem that the destination cannot be found due to the occlusion of the occluder.

In a possible implementation, the method further includes:

in a case where the target visible angle includes a horizontal target visible angle and a vertical target visible angle, determining a target position according to the horizontal target visible angle and the vertical target visible angle; and marking a POI name in the first POI data of the target object at the target position.

In practical applications, a specific target position can be determined according to the horizontal target visible angle and the vertical target visible angle. The target position is the position of a point on the three-dimensional model of the target object, and the POI name in the first POI data of the target object can be marked on the target position of the target object.

In the embodiment of the present disclosure, the POI name is marked on the target position determined according to the horizontal target visible angle and the vertical target visible angle, so that the user can observe the POI name of the target object at the navigation end position, avoiding the problem that the destination cannot be found due to the occlusion of the occluder, and making the marking position of the POI name more accurate.

In a possible implementation, the determining the target visible angle of the target object relative to the occluder according to the first tangent line, the second tangent line, the third tangent line, and the fourth tangent line, includes:
  determining a first included angle between the first tangent line and the second tangent line;
  determining a second included angle between the third tangent line and the fourth tangent line; and
  determining the target visible angle of the target object relative to the occluder according to the first included angle and the second included angle.

In practical applications, the first included angle between the first tangent line and the second tangent line, that is, the visible angle of observing the target object at the position of the observation point, can be determined according to the first tangent line and the second tangent line (the visible angle at this time is the visible angle when the occluder is not considered); and the second included angle between the third tangent line and the fourth tangent line, that is, the visible angle of observing the occluder at the position of the observation point, can be determined according to the third tangent line and the fourth tangent line. According to the visible angle of observing the target object and the visible angle of observing the occluder, the target visible angle of the target object relative to the occluder, that is, the visible angle of observing the target object from the position of the observation point when there is an occluder, can be determined.

In the embodiment of the present disclosure, the target visible angle of the target object relative to the occluder is determined according to the included angle between the two tangent lines, of the target object and the occluder, passing through the observation point respectively. The calculation is simple and the result is accurate.

Herein, the specific implementation of determining the target visible angle is shown in the following embodiments.

In a possible implementation, the determining the target visible angle of the target object relative to the occluder according to the first included angle and the second included angle, includes:
  determining an occlusion angle of the target object relative to the occluder according to the first included angle and the second included angle; and
  determining the target visible angle of the target object relative to the occluder according to the first included angle and the occlusion angle.

In practical applications, the intersection of the first included angle and the second included angle is determined according to the first included angle and the second included angle, the angle formed by the intersection is the occlusion angle of the target object relative to the occluder. The first included angle minus the occlusion angle is the visible angle of the target object relative to the occluder. The target visible angle is an angle within the visible angle range. According to the visible angle, the target visible angle of the target object relative to the occluder can be determined.

In the embodiment of the present disclosure, the target visible angle of the target object relative to the occluder can be determined according to the visible angle of observing the target object at the position of the observation point and the visible angle of observing the occluder at the position of the observation point. The calculation process is simple, and the result is accurate.

Herein, according to different directions of the occlusion angle, the processing methods for determining the target visible angle of the target object relative to the occluder are different, and the details are shown in the following embodiments.

In a possible implementation, the determining the target visible angle according to the first included angle and the occlusion angle, includes:
  in a case where the occlusion angle is a horizontal occlusion angle, determining a horizontal visible angle of the target object relative to the occluder according to the first included angle and the horizontal occlusion angle; and
  taking an included angle between an angle bisector of the horizontal visible angle and a true north direction as a horizontal target visible angle.

In practical applications, in a case where the occlusion angle is the horizontal occlusion angle, the occlusion angle is calculated according to the top view of the target object and the occluder, and the included angle between the angle bisector of the horizontal visible angle and the true north direction is taken as the horizontal target visible angle. The target object is observed at the position of the observation point with the horizontal target visible angle, which is the best viewing angle in the horizontal direction.

In the embodiment of the present disclosure, the included angle between the angle bisector of the horizontal visible angle and the true north direction is taken as the horizontal target visible angle, so that the best viewing angle in the horizontal direction can be obtained.

In a possible implementation, the determining the target visible angle according to the first included angle and the occlusion angle, includes:
  in a case where the occlusion angle is a vertical occlusion angle, determining a vertical visible angle of the target object relative to the occluder according to the first included angle and the vertical occlusion angle; and
  taking an included angle between an angle bisector of the vertical visible angle and a ground plane as a vertical target visible angle.

In practical applications, in a case where the occlusion angle is the vertical occlusion angle, the occlusion angle is calculated according to the left view or right view of the target object and the occluder, and the included angle between the angle bisector of the vertical visible angle and the ground plane is taken as the vertical target visible angle. The target object is observed at the position of the observation point with the vertical target visible angle, which is the best viewing angle in the vertical direction.

In the embodiment of the present disclosure, the included angle between the angle bisector of the vertical visible angle and the ground plane is taken as the vertical target visible angle, so that the best viewing angle in the vertical direction can be obtained.

In addition, when determining the horizontal tangent line of the target object, different processing methods are also included, as detailed in the following embodiments.

In a possible implementation, the determining the first tangent line and the second tangent line of the target object, passing through the position of the observation point, according to the first POI data and the position of the observation point, includes:

determining the first tangent line and the second tangent line of the target object in a horizontal direction, passing through the position of the observation point, according to position coordinates of boundary points of an area of interest AOI in the first POI data and the position of the observation point.

In practical applications, when calculating the horizontal tangent line of the target object, the AOI data in the pre-stored first POI data of the target object is called for calculation. The AOI data includes the position coordinates of the boundary points of the AOI, that is, the position coordinates of each boundary point of the top view of the target object. The position coordinates of each boundary point are connected to the position of the observation point to obtain a straight line, and a plurality of straight lines are obtained according to the position coordinates of a plurality of boundary points and the position of the observation point. Herein, if all points in the top view of the target object are on the same side of a straight line, the straight line is a tangent line of the target object. There are two straight lines that satisfy this condition, which are the first tangent line and the second tangent line of the target object in the horizontal direction respectively.

In the embodiment of the present disclosure, the first tangent line and the second tangent line in the horizontal direction of the target object can be determined as the basis for calculating the horizontal target visible angle. The calculation process is simple and the result is accurate.

It can be understood that the calculation of the third tangent line and the fourth tangent line of the occluder can also adopt the same processing method as the above-mentioned embodiment. According to the position coordinates of the boundary point of the area of interest AOI in the second POI data and the position of the observation point, the third tangent line and the fourth tangent line of the occluder in the horizontal direction, passing through the position of the observation point are determined.

Figure 2:
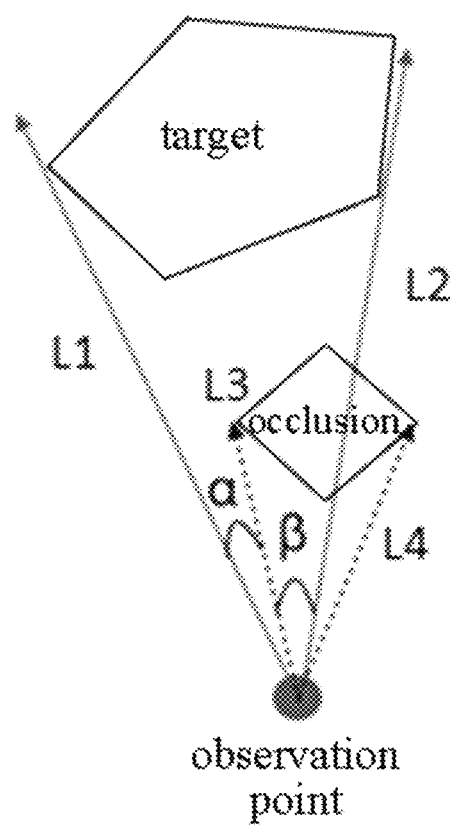
FIG. 2 is a schematic diagram of horizontal tangent lines of a target object and an occluder according to an embodiment of the present disclosure.

FIG. 2 is a schematic diagram of horizontal tangent lines of a target object and an occluder according to an embodiment of the present disclosure. As shown in the figure, the tangent lines in the horizontal direction, of the top view of the target object ("target" as shown in the figure), passing through the position of the observation point are shown as L1 and L2 in the figure; and the tangent lines in the horizontal direction, of the top view of the occluder ("occlusion" as shown in the figure), passing through the position of the observation point are shown as L3 and L4 in the figure. Herein, the included angle between L1 and L2 is the visible angle of the target object, the included angle between L3 and L4 is the visible angle of the occluder, the angle β formed by the intersection of the two visible angles is the occlusion angle, and α is the visible angle of the target object relative to the occluder.

Figure 3:
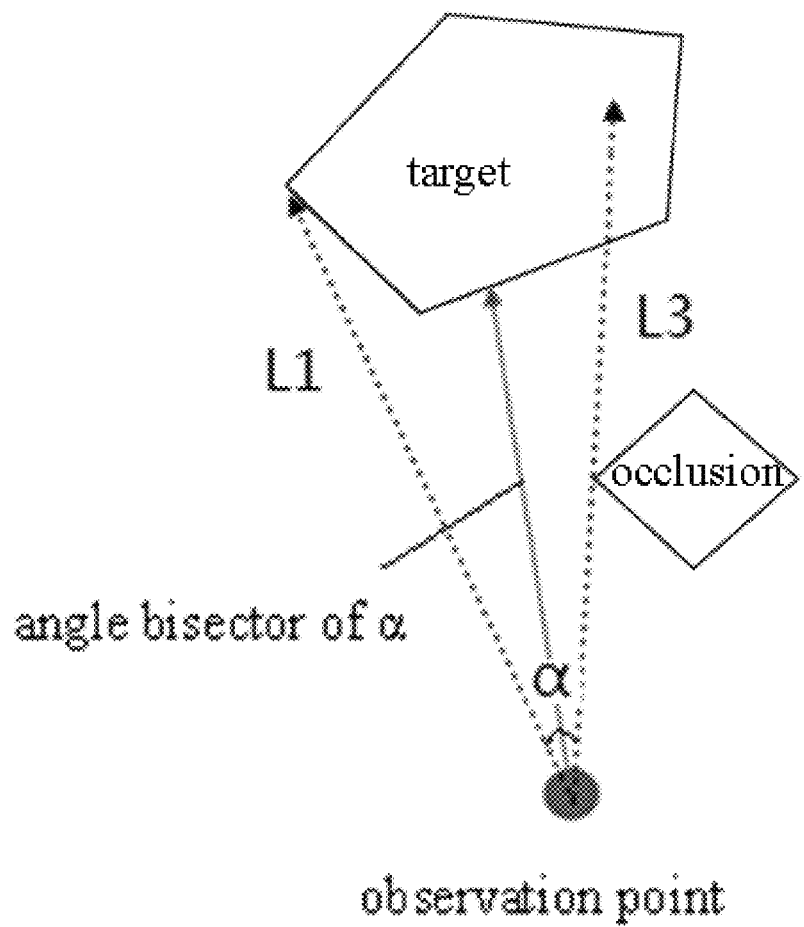
FIG. 3 is a schematic diagram of a visible angle of a target object relative to an occluder according to an embodiment of the present disclosure.

FIG. 3 is a schematic diagram of the visible angle of the target object relative to the occluder according to an embodiment of the present disclosure. As shown in the figure, L1 is a tangent line of the target object; L3 is a tangent line of the occluder, and α is the target object relative to the occluder, and the included angle between the angle bisector of α and the true north direction is the target visible angle of the target object relative to the horizontal direction of the occluder.

In a possible implementation, the determining the first tangent line and the second tangent line of the target object, passing through the position of the observation point, according to the first POI data and the position of the observation point, includes:

determining the first tangent line and the second tangent line of the target object in a horizontal direction, passing through the position of the observation point, according to vertex position coordinates of a circumscribed rectangle of an AOI in the first POI data and the position of the observation point.

In practical applications, the circumscribed rectangle can also be determined according to the AOI data of the target object, and each of vertexes of the circumscribed rectangle is connected with the position of the observation point, to obtain four straight lines. It can be seen from the calculation that two straight lines thereof satisfy the tangent line condition. The two straight lines are taken as the first tangent line and the second tangent line of the target object in the horizontal direction.

In the embodiment of the present disclosure, the first tangent line and the second tangent line of the target object are determined through the vertexes of the circumscribed rectangle, which can reduce the amount of calculation compared to calculating the tangent lines through all the boundary points of the AOI.

It can be understood that the calculation of the third tangent line and the fourth tangent line of the occluder can also adopt the same processing method as the above-mentioned embodiment. According to the position coordinates of vertexes of the circumscribed rectangle of the AOI in the second POI data and the position of the observation point, the third tangent line and the fourth tangent line of the occluder in the horizontal direction, passing through the position of the observation point are determined.

It can be understood that, in the above embodiment, compared determining the tangent lines by the position coordinates of the boundary points of the AOI with determining the tangent lines by the vertexes of the circumscribed rectangle, the calculation result of the former is more accurate, but the calculation amount is larger; while the calculation amount of the later is smaller, but there is an error which is within an acceptable range. Therefore, the corresponding calculation method can be selected according to specific needs.

Figure 4:
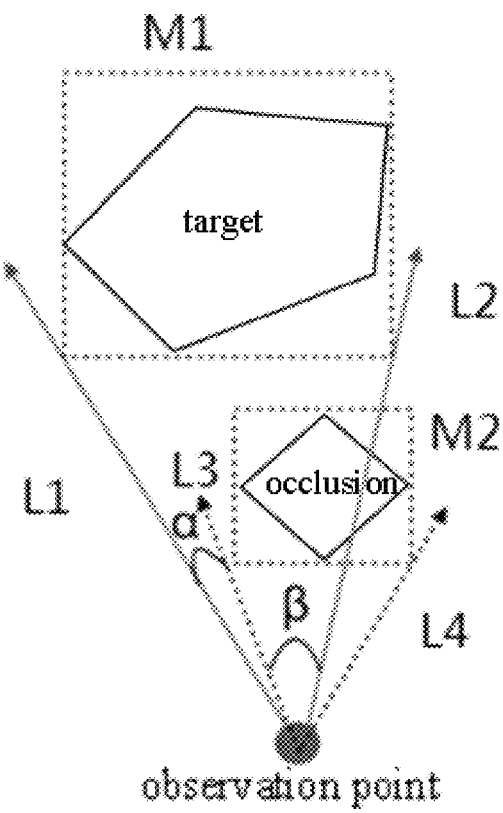
FIG. 4 is a schematic diagram of horizontal tangent lines of a target object and an occluder according to an embodiment of the present disclosure.

FIG. 4 is a schematic diagram of horizontal tangent lines of a target object and an occluder according to an embodiment of the present disclosure. As shown in the figure, the tangent lines in the horizontal direction, of the top view of the target object ("target" as shown in the figure), passing through the position of the observation point are shown as L1 and L2 in the figure, and the circumscribed rectangle of the target object is shown as M1 in the figure; and the tangent lines in the horizontal direction, of the top view of the occluder ("occlusion" as shown in the figure), passing through the position of the observation point are shown as L3 and L4 in the figure, and the circumscribed rectangle of the occluder is shown as M2 in the figure. Herein, the included angle between L1 and L2 is the visible angle of the target object, the included angle between L3 and L4 is the visible angle of the occluder, the angle β formed by the intersection of the two visible angles is the occlusion angle, and α is the visible angle of the target object relative to the occluder.

In addition, when determining the tangent lines in the vertical direction of the target object, it is different from the processing method in the horizontal direction, and the details are shown in the following embodiments.

In a possible implementation, the determining the first tangent line and the second tangent line of the target object, passing through the position of the observation point, according to the first POI data and the position of the observation point, includes:

determining the first tangent line of the target object in a vertical direction, passing through the position of the observation point, according to position coordinates of a highest point of the target object in the first POI data and the position of the observation point; and determining the second tangent line of the target object in the vertical direction, passing through the position of the observation point, according to position coordinates of a lowest point of the target object in the first POI data and the position of the observation point.

In practical applications, the first POI data includes the coordinates of the highest point and the lowest point of the target object. When determining the tangent line of the target object in the vertical direction, the first tangent line and the second tangent line of the target object can be obtained by connecting the position coordinates of the highest point and the lowest point of the target object with the position of the observation point respectively. Herein, the lowest point of the target object can be a point on the ground plane.

In the embodiment of the present disclosure, the tangent lines of the target object in the vertical direction can be determined based on the position coordinates of the highest point and the position coordinates of the lowest point of the target object. The calculation process is simple, and the result is accurate.

It can be understood that the calculation of the third tangent line and the fourth tangent line of the occluder can also adopt the same processing method as the above-mentioned embodiment. The third tangent line and fourth tangent line of the occluder in the vertical direction, passing through the position of the observation point are determined according to the coordinates of the highest point and the coordinates of the lowest point of the target object in the second POI data and the position of the observation point. Herein, the lowest point of the occluder can be a point on the ground plane.

Figure 5:
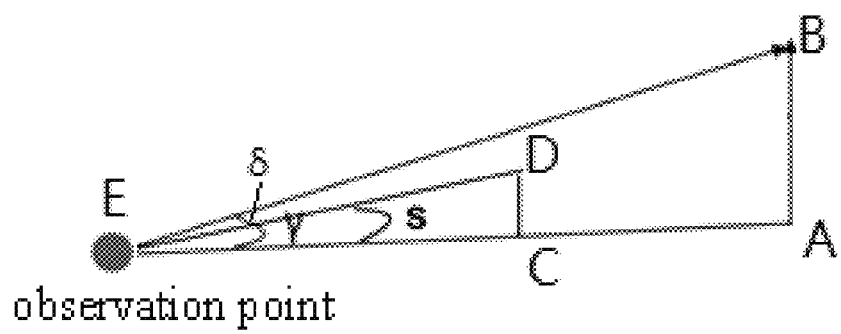
FIG. 5 is a schematic diagram of vertical tangent lines of a target object and an occluder according to an embodiment of the present disclosure.

FIG. 5 is a schematic diagram of vertical tangent lines of a target object and an occluder according to an embodiment of the present disclosure. As shown in the figure, the highest point of the target object is B, and the lowest point of the target object is A; the highest point of the occluder is D, and the lowest point of the occluder is C, two tangent lines of the target object in the vertical direction are the straight line where AE is located and the straight line where BE is located, and the visible angle of the target object is γ; two tangent lines of the occluder in the vertical direction are the straight line where CE is located and the straight line where DE is located, the visible angle is s; the visible angle of the target object relative to the occluder is δ, and the included angle between the angle bisector of δ and the ground plane is the vertical target visible angle of the target object relative to the occluder.

In addition, in an actual scene, there may be a plurality of occluders. In a case where there are a plurality of occluders, how to determine the target visible angle of the target object relative to the occluders refers to the following embodiments for details.

In a possible implementation, the determining the target visible angle of the target object relative to the occluder according to the first tangent line, the second tangent line, the third tangent line, and the fourth tangent line, includes:

determining a first included angle between the first tangent line and the second tangent line, in a case where there are a plurality of occluders;

determining a second included angle between the third tangent line and the fourth tangent line of each of the occluders; and determining the target visible angle of the target object relative to the occluders according to the first included angle and an intersection of respective second included angles.

In practical applications, in a case where there are a plurality of occluders, the first included angle between the first tangent line and the second tangent line, that is, the visible angle of the target object, passing through the position of the observation point, is determined according to the first tangent line and the second tangent line of the target object. For each occluder, the second included angle between the third tangent line and the fourth tangent line, that is, the visible angle of the occluder, passing through the position of the observation point, is determine according to the third tangent line and fourth tangent line of the occluder. Since there are a plurality of occluders, a plurality of visible angles are obtained, the intersection of the plurality of visible angles is calculated, and the angle corresponding to the intersection is taken as the occlusion angle of all the occluders. According to the first included angle and the occlusion angle of all the occluders, the target visible angle of the target object relative to the occluders is determined.

In the embodiment of the present disclosure, in a case where there are a plurality of occluders, the target visible angle of the target object relative to the occluders can be determined based on the occlusion angles of the a plurality of occluders.

In addition, when calculating the tangent lines of the target object, the specific occlusion range needs to be considered. For details, see the following embodiments.

In a possible implementation, the determining the first tangent line and the second tangent line of the target object, passing through the position of the observation point, according to the first POI data and the position of the observation point, includes:

determining a visible range of the target object relative to the occluder according to the first POI data, the second POI data, and the position of the observation point; and in a case where the visible range satisfies a preset condition, determining the first tangent line and the second tangent line of the target object, passing through the position of the observation point, according to the first POI data and the position of the observation point.

In practical applications, the horizontal visible range of the target object relative to the occluder, that is, the horizontal visible range of observing the target object at the position of the observation point in a case where there is an occluder, can be determined according to the position coordinates of each point of the AOI in the first POI data, the position coordinates of each point of the AOI in the second POI data, and the position of the observation point. This visible range includes, but is not limited to the proportion of the visible part of the target object to the entire target object in the horizontal direction. If the visible range meets the preset condition, it can also be understood that the visible range is large enough, the first tangent line and the second tangent line of the target object in the horizontal direction are calculated, and then the horizontal target visible angle of the target object relative to the occluder is calculated. If the visible range does not meet the preset condition, the horizontal target visible angle may not be calculated.

In addition, the vertical visible range of the target object relative to the occluder can be determined according to the position coordinates of the highest point and the position coordinates of the lowest point of the target object, the position coordinates of the highest point and the position coordinates of the lowest point of the occluder, and the position of the observation point. This visible range includes but is not limited to the height difference between the target object and the occluder. If the visible range meets the preset condition, the first tangent line and the second tangent line of the target object in the vertical direction are calculated, and then the vertical target visible angle of the target object relative to the occluder is calculated.

In the embodiment of the present disclosure, it can be determined whether to calculate the first tangent line and the second tangent line of the target object by determining the visible range of the target object relative to the occluder, and then the target visible angle is calculated. If the visible range is too small or there is not the visible range, the visible range does not need to be calculated.

Figure 6:
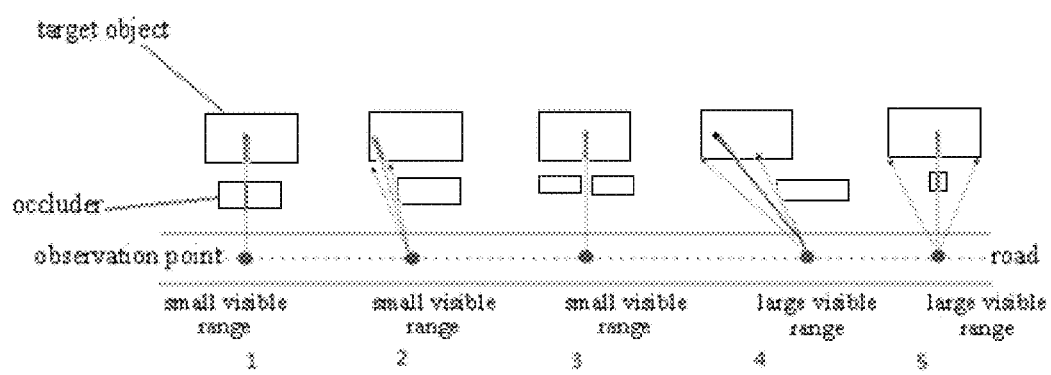
FIG. 6 is a schematic diagram of a horizontal occlusion situation of a target object and an occluder according to an embodiment of the present disclosure.

FIG. 6 is a schematic diagram of a horizontal occlusion situation of a target object and an occluder according to an embodiment of the present disclosure. The top view of the target object and the occluder is shown in FIG. 6. The figure shows five occlusion situations. For the first, second, and third occlusion situations, the visible range is small, and it is not suitable for POI name labeling, thus the horizontal tangent line and the horizontal target visible angle of the target object relative to the occluder are not calculated. For the fourth and fifth occlusion situations, the visible range is large and it is suitable for POI name labeling, thus the horizontal tangent line and the horizontal target visible angle of the target object relative to the occluder are calculated.

Figure 7:
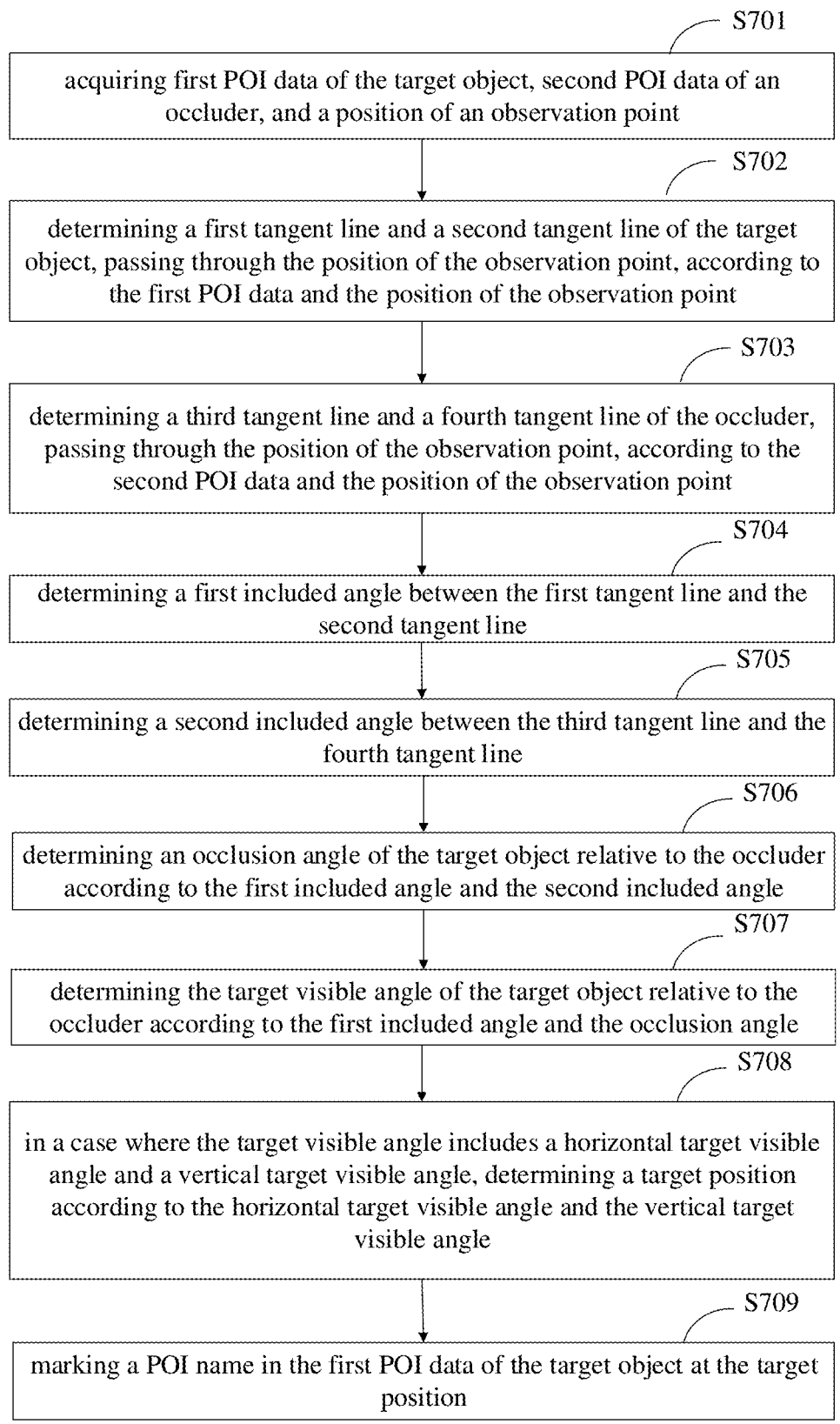
FIG. 7 is a flowchart of a method for determining a visible angle of a target object according to an embodiment of the present disclosure.

According to an embodiment of the present disclosure, a method for determining a visible angle of a target object is provided. FIG. 7 is a flowchart of a method for determining a visible angle of a target object according to an embodiment of the present disclosure. As shown in FIG. 7, the method includes:

S701, acquiring first POI data of the target object, second POI data of an occluder, and a position of an observation point;

S702, determining a first tangent line and a second tangent line of the target object, passing through the position of the observation point, according to the first POI data and the position of the observation point;

S703, determining a third tangent line and a fourth tangent line of the occluder, passing through the position of the observation point, according to the second POI data and the position of the observation point;

S704, determining a first included angle between the first tangent line and the second tangent line;

S705, determining a second included angle between the third tangent line and the fourth tangent line;

S706, determining an occlusion angle of the target object relative to the occluder according to the first included angle and the second included angle;

S707, determining the target visible angle of the target object relative to the occluder according to the first included angle and the occlusion angle;

S708, in a case where the target visible angle includes a horizontal target visible angle and a vertical target visible angle, determining a target position according to the horizontal target visible angle and the vertical target visible angle; and S709, marking a POI name in the first POI data of the target object at the target position.

According to the method for determining a visible angle of a target object provided by the present disclosure, the target visible angle of the target object relative to the occluder is determined according to the first POI data of the target object, the second POI data of the occluder, and the position of the observation point, the target visible angle can be taken as the guiding angle to guide a user to observe the target object, the calculation is simple, and the result is accurate.

Figure 8:
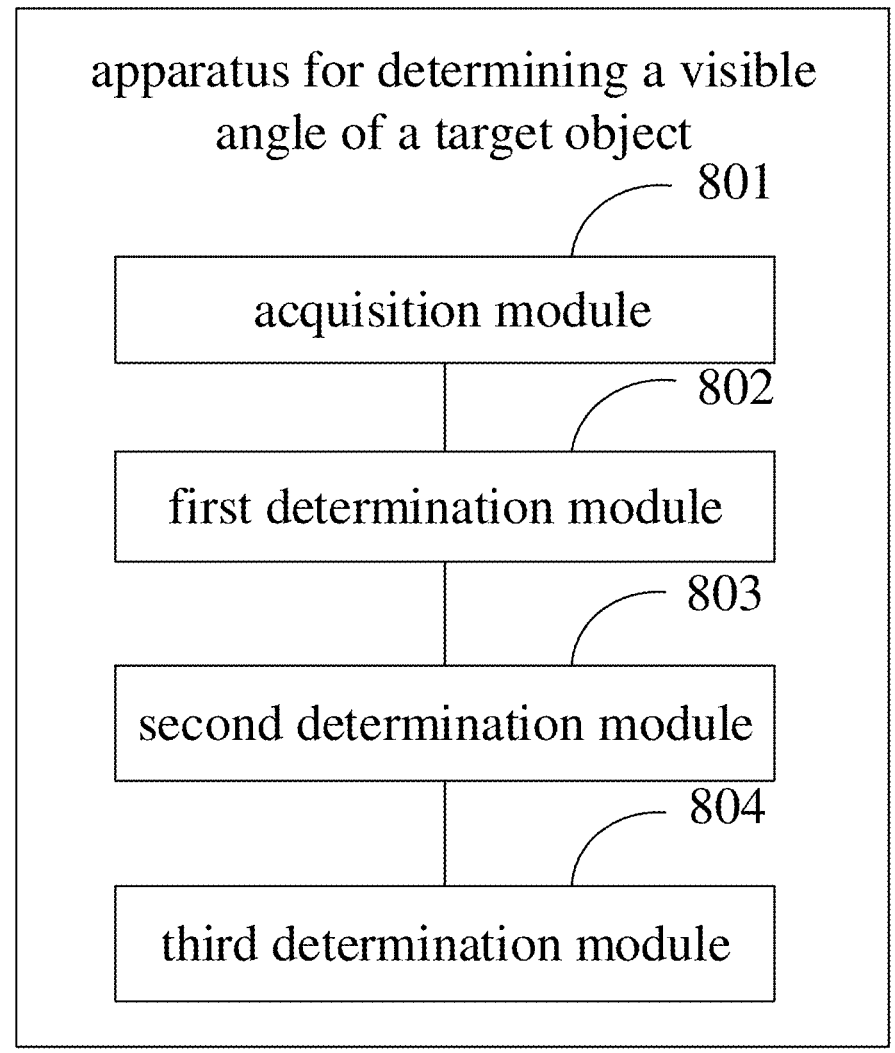
FIG. 8 is a schematic structural diagram of an apparatus for determining a visible angle of a target object according to an embodiment of the present disclosure.

According to an embodiment of the present disclosure, an apparatus for determining a visible angle of a target object is provided. FIG. 8 is a schematic structural diagram of an apparatus for determining a visible angle of a target object according to an embodiment of the present disclosure. As shown in FIG. 8, the apparatus includes:

an acquisition module 801, configured for acquiring first point of interest POI data of the target object, second POI data of an occluder, and a position of an observation point;

a first determination module 802, configured for determining a first tangent line and a second tangent line of the target object, passing through the position of the observation point, according to the first POI data and the position of the observation point;

a second determination module 803, configured for determining a third tangent line and a fourth tangent line of the occluder, passing through the position of the observation point, according to the second POI data and the position of the observation point; and a third determination module 804, configured for determining a target visible angle of the target object relative to the occluder according to the first tangent line, the second tangent line, the third tangent line, and the fourth tangent line.

In a possible implementation, the apparatus further includes a labeling module, configured for:

in a case where the target visible angle includes a horizontal target visible angle or a vertical target visible angle, marking a POI name in the first POI data of the target object according to the horizontal target visible angle or the vertical target visible angle.

In a possible implementation, the apparatus further includes a labeling module, configured for:

in a case where the target visible angle includes a horizontal target visible angle and a vertical target visible angle, determining a target position according to the horizontal target visible angle and the vertical target visible angle; and marking a POI name in the first POI data of the target object at the target position.

Figure 9:
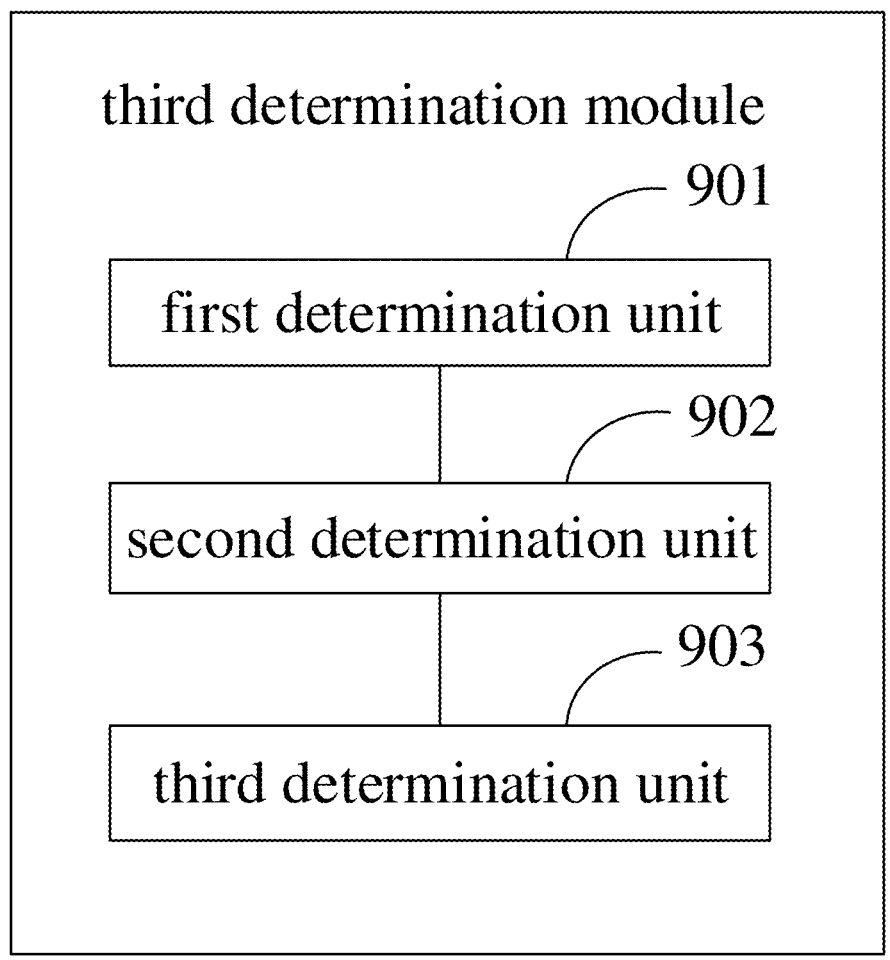
FIG. 9 is a schematic structural diagram of a third determination module according to an embodiment of the present disclosure.

FIG. 9 is a schematic structural diagram of the third determination module according to an embodiment of the present disclosure. As shown in FIG. 9, in a possible implementation, the third determination module includes a first determination unit 901, a second determination unit 902, and a third determination unit 903;

the first determination unit 901 is configured for determining a first included angle between the first tangent line and the second tangent line;

the second determination unit 902 is configured for determining a second included angle between the third tangent line and the fourth tangent line; and the third determination unit 903 is configured for determining the target visible angle of the target object relative to the occluder according to the first included angle and the second included angle.

In a possible implementation, the third determination unit is specifically configured for:

determining an occlusion angle of the target object relative to the occluder according to the first included angle and the second included angle; and determining the target visible angle of the target object relative to the occluder according to the first included angle and the occlusion angle.

In a possible implementation, when the third determination unit determines the target visible angle according to the first included angle and the occlusion angle, the third determination unit is configured for:

in a case where the occlusion angle is a horizontal occlusion angle, determining a horizontal visible angle of the target object relative to the occluder according to the first included angle and the horizontal occlusion angle; and taking an included angle between an angle bisector of the horizontal visible angle and a true north direction as a horizontal target visible angle.

In a possible implementation, when the third determination unit determines the target visible angle according to the first included angle and the occlusion angle, the third determination unit is configured for:

in a case where the occlusion angle is a vertical occlusion angle, determining a vertical visible angle of the target object relative to the occluder according to the first included angle and the vertical occlusion angle; and taking an included angle between an angle bisector of the vertical visible angle and a ground plane as a vertical target visible angle.

In a possible implementation, the first determination module 802 is configured for:

determining the first tangent line and the second tangent line of the target object in a horizontal direction, passing through the position of the observation point, according to position coordinates of boundary points of an area of interest AOI in the first POI data and the position of the observation point.

In a possible implementation, the first determination module 802 is configured for:

determining the first tangent line and the second tangent line of the target object in a horizontal direction, passing through the position of the observation point, according to vertex position coordinates of a circumscribed rectangle of an AOI in the first POI data and the position of the observation point.

In a possible implementation, the first determination module 802 is configured for:

determining the first tangent line of the target object in a vertical direction, passing through the position of the observation point, according to position coordinates of a highest point of the target object in the first POI data and the position of the observation point; and determining the second tangent line of the target object in the vertical direction, passing through the position of the observation point, according to position coordinates of a lowest point of the target object in the first POI data and the position of the observation point.

In a possible implementation, the third determination module 804 is configured for:

determining a first included angle between the first tangent line and the second tangent line, in a case where there are a plurality of occluders;

determining a second included angle between the third tangent line and the fourth tangent line of each of the occluders; and determining the target visible angle of the target object relative to the occluders according to the first included angle and an intersection of respective second included angles.

In a possible implementation, the first determination module 802 is configured for:

determining a visible range of the target object relative to the occluder according to the first POI data, the second POI data, and the position of the observation point; and in a case where the visible range satisfies a preset condition, determining the first tangent line and the second tangent line of the target object, passing through the position of the observation point, according to the first POI data and the position of the observation point.

For the functions of respective units, modules or sub-modules in the respective apparatuses in the embodiments of the present disclosure, reference can be made to the corresponding descriptions in the foregoing method embodiments, and details are not described herein again.

According to embodiments of the present disclosure, the present disclosure also provides an electronic device, a readable storage medium, and a computer program product.

According to another aspect of the present disclosure, there is provided a computer program product including a computer program/computer instructions, wherein the computer program/the computer instructions, when executed by a processor, implements/implement the method in any one of the embodiments of the present disclosure.

Figure 10:
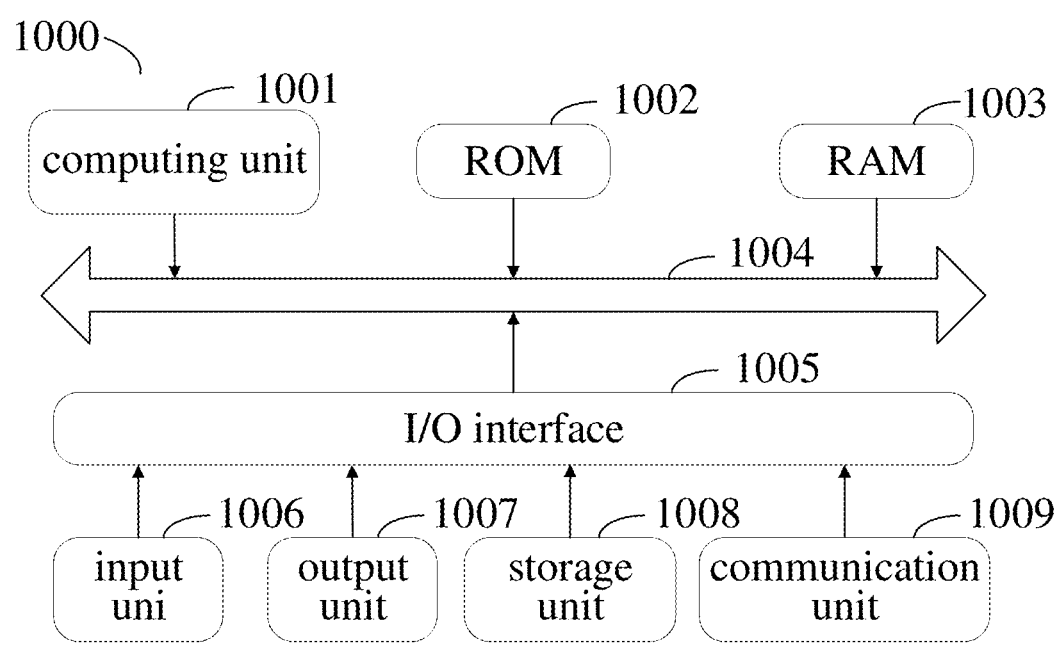
FIG. 10 is a block diagram of an electronic device configured to implement the method for determining a visible angle of a target object according to an embodiment of the present disclosure.

FIG. 10 shows a schematic block diagram of an example electronic device 1000 that can be configured to implement the method for determining a visible angle of a target object of the embodiment of the present disclosure. The electronic device is intended to represent various forms of digital computers, such as laptop computers, desktop computers, workstations, personal digital assistants, servers, blade servers, mainframe computers, and other suitable computers. The electronic device can also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the present disclosure described and/or claimed herein.

As shown in FIG. 10, the electronic device 1000 includes a computing unit 1001 that can perform various suitable actions and processes in accordance with computer programs stored in a read only memory (ROM) 1002 or computer programs loaded from a storage unit 1008 into a random access memory (RAM) 1003. In the RAM 1003, various programs and data required for the operation of the electronic device 1000 can also be stored. The computing unit 1001, the ROM 1002, and the RAM 1003 are connected to each other through a bus 1004. An input/output (I/O) interface 1005 is also connected to the bus 1004.

A plurality of components in the electronic device 1000 are connected to the I/O interface 1005, including: an input unit 1006, such as a keyboard, a mouse, etc.; an output unit 1007, such as various types of displays, speakers, etc.; a storage unit 1008, such as a magnetic disk, an optical disk, etc.; and a communication unit 1009, such as a network card, a modem, a wireless communication transceiver, etc. The communication unit 1009 allows the electronic device 1000 to exchange information/data with other devices over a computer network, such as the Internet, and/or various telecommunications networks.

The computing unit 1001 can be various general purpose and/or special purpose processing assemblies having processing and computing capabilities. Some examples of the computing unit 1001 include, but are not limited to, a central processing unit (CPU), a graphics processing unit (GPU), various specialized artificial intelligence (AI) computing chips, various computing units running machine learning model algorithms, a digital signal processor (DSP), and any suitable processor, controller, microcontroller, etc. The computing unit 1001 performs various methods and processes described above, such as the method for determining a visible angle of a target object. For example, in some embodiments, the method for determining a visible angle of a target object can be implemented as computer software programs that are physically contained in a machine-readable medium, such as the storage unit 1008. In some embodiments, some or all of the computer programs can be loaded into and/or installed on the electronic device 1000 via the ROM 1002 and/or the communication unit 1009. In a case where the computer programs are loaded into the RAM 1003 and executed by the computing unit 1001, one or more of operations of the method for determining a visible angle of a target object described above can be performed. Alternatively, in other embodiments, the computing unit 1001 can be configured to perform the method for determining a visible angle of a target object in any other suitable manner (e.g., by means of a firmware).

Various implementations of the systems and techniques described herein above can be implemented in a digital electronic circuit system, an integrated circuit system, a field programmable gate array (FPGA), an application specific integrated circuit (ASIC), an application specific standard product (ASSP), a system on a chip (SOC), a load programmable logic device (CPLD), a computer hardware, firmware, software, and/or a combination thereof. These various implementations can include an implementation in one or more computer programs, which can be executed and/or interpreted on a programmable system including at least one programmable processor; the programmable processor can be a dedicated or general-purpose programmable processor and capable of receiving and transmitting data and instructions from and to a storage system, at least one input device, and at least one output device.

The program codes for implementing the method of the present disclosure can be written in any combination of one or more programming languages. These program codes can be provided to a processor or controller of a general purpose computer, a special purpose computer, or other programmable data processing apparatus such that the program codes, when executed by the processor or controller, enable the functions/operations specified in the flowchart and/or the block diagram to be implemented. The program codes can be executed entirely on a machine, partly on a machine, partly on a machine as a stand-alone software package and partly on a remote machine, or entirely on a remote machine or server.

In the context of the present disclosure, the machine-readable medium can be a tangible medium that can contain or store programs for using by or in connection with an instruction execution system, apparatus or device. The machine-readable medium can be a machine-readable signal medium or a machine-readable storage medium. The machine-readable medium can include, but is not limited to, an electronic, magnetic, optical, electromagnetic, infrared, or semiconductor system, apparatus or device, or any suitable combination thereof. More specific examples of the machine-readable storage medium can include one or more wire-based electrical connection, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof.

In order to provide an interaction with a user, the system and technology described here can be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user can be any form of sensory feedback (e.g., visual feedback, auditory feedback, or tactile feedback); and an input from the user can be received in any form (including an acoustic input, a voice input or a tactile input).

The systems and techniques described herein can be implemented in a computing system (e.g., as a data server) that includes a background component, or a computing system (e.g., an application server) that includes a middleware component, or a computing system (e.g., a user computer having a graphical user interface or a web browser through which a user can interact with embodiments of the systems and techniques described herein) that includes a front-end component, or a computing system that includes any combination of such a background component, middleware component, or front-end component. The components of the system can be connected to each other through a digital data communication in any form or medium (e.g., a communication network). Examples of the communication network include a local area network (LAN), a wide area network (WAN), and the Internet.

The computer system can include a client and a server. The client and the server are typically remote from each other and typically interact via the communication network. The relationship of the client and the server is generated by computer programs running on respective computers and having a client-server relationship with each other. The server can be a cloud server, a distributed system server, or a server combined with a blockchain.

It should be understood that the operations can be reordered, added or deleted using the various flows illustrated above. For example, the operations described in the present disclosure can be performed concurrently, sequentially, or in a different order, so long as the desired results of the technical solutions disclosed in the present disclosure can be achieved, and there is no limitation herein.

The above-described specific embodiments do not limit the protection scope of the present disclosure. It will be apparent to those skilled in the art that various modifications, combinations, sub-combinations, and substitutions are possible, depending on design requirements and other factors. Any modifications, equivalent substitutions, and improvements within the spirit and principles of the present disclosure are intended to be included within the protection scope of the present disclosure.

What is claimed is:

1. An electronic device, comprising:
   at least one processor; and
   a memory communicatively connected with the at least one processor, wherein the memory stores instructions executable by the at least one processor, and the instructions, when executed by the at least one processor, enable the at least one processor to perform operations of:

acquiring first point of interest POI data of the target object, second POI data of an occluder, and a position of an observation point;

determining a first tangent line and a second tangent line of the target object, passing through the position of the observation point, according to the first POI data and the position of the observation point;

determining a third tangent line and a fourth tangent line of the occluder, passing through the position of the observation point, according to the second POI data and the position of the observation point;

determining a first included angle between the first tangent line and the second tangent line;

determining a second included angle between the third tangent line and the fourth tangent line;

determining an occlusion angle of the target object relative to the occluder according to the first included angle and the second included angle;

in a case where the occlusion angle is a horizontal occlusion angle, determining a horizontal visible angle of the target object relative to the occluder according to the first included angle and the horizontal occlusion angle; and taking an included angle between an angle bisector of the horizontal visible angle and a true north direction as a horizontal target visible angle; or in a case where the occlusion angle is a vertical occlusion angle, determining a vertical visible angle of the target object relative to the occluder according to the first included angle and the vertical occlusion angle; and taking an included angle between an angle bisector of the vertical visible angle and a ground plane as a vertical target visible angle.

2. The electronic device of claim 1, wherein the instructions, when executed by the at least one processor, enable the at least one processor to perform further an operation of:

in a case where the target visible angle comprises a horizontal target visible angle or a vertical target visible angle, marking a POI name in the first POI data of the target object according to the horizontal target visible angle or the vertical target visible angle.

3. The electronic device of claim 1, wherein the instructions, when executed by the at least one processor, enable the at least one processor to perform further operations of:

in a case where the target visible angle comprises a horizontal target visible angle and a vertical target visible angle, determining a target position according to the horizontal target visible angle and the vertical target visible angle; and marking a POI name in the first POI data of the target object at the target position.

4. The electronic device of claim 1, wherein the instructions, when executed by the at least one processor, enable the at least one processor to perform further operations of:

determining the first tangent line and the second tangent line of the target object in a horizontal direction, passing through the position of the observation point, according to position coordinates of boundary points of an area of interest AOI in the first POI data and the position of the observation point.

5. The electronic device of claim 1, wherein the instructions, when executed by the at least one processor, enable the at least one processor to perform further operations of:

determining the first tangent line and the second tangent line of the target object in a horizontal direction, passing through the position of the observation point, according to vertex position coordinates of a circumscribed rectangle of an AOI in the first POI data and the position of the observation point.

6. The electronic device of claim 1, wherein the instructions, when executed by the at least one processor, enable the at least one processor to perform further operations of:

determining the first tangent line of the target object in a vertical direction, passing through the position of the observation point, according to position coordinates of a highest point of the target object in the first POI data and the position of the observation point; and determining the second tangent line of the target object in the vertical direction, passing through the position of the observation point, according to position coordinates of a lowest point of the target object in the first POI data and the position of the observation point.

7. The electronic device of claim 1, wherein the instructions, when executed by the at least one processor, enable the at least one processor to perform further operations of:

determining a first included angle between the first tangent line and the second tangent line, in a case where there are a plurality of occluders;

determining a second included angle between the third tangent line and the fourth tangent line of each of the occluders; and determining the target visible angle of the target object relative to the occluders according to the first included angle and an intersection of respective second included angles.

8. The electronic device of claim 1, wherein the instructions, when executed by the at least one processor, enable the at least one processor to perform further operations of:

determining a visible range of the target object relative to the occluder according to the first POI data, the second POI data, and the position of the observation point; and in a case where the visible range satisfies a preset condition, determining the first tangent line and the second tangent line of the target object, passing through the position of the observation point, according to the first POI data and the position of the observation point.

9. A non-transitory computer-readable storage medium storing computer instructions, wherein the computer instructions, when executed by a computer, cause the computer to perform operations of:

acquiring first point of interest POI data of the target object, second POI data of an occluder, and a position of an observation point;

determining a first tangent line and a second tangent line of the target object, passing through the position of the observation point, according to the first POI data and the position of the observation point;

determining a third tangent line and a fourth tangent line of the occluder, passing through the position of the observation point, according to the second POI data and the position of the observation point;

determining a first included angle between the first tangent line and the second tangent line;

determining a second included angle between the third tangent line and the fourth tangent line:

determining an occlusion angle of the target object relative to the occluder according to the first included angle and the second included angle;

in a case where the occlusion angle is a horizontal occlusion angle, determining a horizontal visible angle of the target object relative to the occluder according to the first included angle and the horizontal occlusion angle; and taking an included angle between an angle bisector of the horizontal visible angle and a true north direction as a horizontal target visible angle; or in a case where the occlusion angle is a vertical occlusion angle, determining a vertical visible angle of the target object relative to the occluder according to the first included angle and the vertical occlusion angle; and taking an included angle between an angle bisector of the vertical visible angle and a ground plane as a vertical target visible angle.

* * * * *